Patented June 4, 1935

2,003,408

UNITED STATES PATENT OFFICE 2,003,408

CELLULOSE ESTERS OF PARTLY ESTERIFIED POLYBASIC ACIDS

Adolf Weihe, Eilenburg in Sachsen, Germany, assignor to Deutsche Celluloid-Fabrik, Eilenburg in Sachsen, Germany, a corporation of Germany No Drawing. Application February 19, 1931, Serial No. 517,111. In Germany February 24, 1930

9 Claims. (Cl. 260—101)

My present invention relates to a new process of manufacturing cellulose esters and more particularly to such cellulose derivatives esterified by radicles of partly esterified polybasic acids.

One of its objects are the new cellulose esters containing chemically bound such compounds generally used as gelatinizing agents in the manufacture of plastic materials.

When films, lacquers and coatings of all kinds are being made from cellulose esters, there are added to the solutions or masses softening agents or gelatinizing agents which ensure the elasticity of the layers. Apart from the aryl phosphates which are, however, not suitable for all purposes, all of the real gelatinizing agents are more or less volatile. The layers containing a cellulose ester, therefore, gradually lose their elasticity, especially when exposed to high temperatures and atmospheric influences.

According to this invention, this drawback is avoided by chemically binding the gelatinizing agent to the molecule of the cellulose ester. This is accomplished by causing a chloride of the acid ester of a polybasic acid, whose neutral esters have a gelatinizing power or can be used as softening agents, to act upon cellulose esters still containing esterifiable OH groups such as, for instance, cellulose dinitrate, acetone-soluble cellulose acetate or other mono- di-esters of cellulose. If required, substances known to be catalysts for the reaction are used, for instance, thionyl chloride, sulfuryl chloride, phosphorus trichloride or phosphorus oxychloride.

The cellulose derivatives which are formed and carry ester groups are soluble in organic solvents and yield very elastic layers without the addition of gelatinizing agents, even when a high degree of softness is desired.

By the choice of the starting material to be esterified, by the nature of the acid derivative participating in the reaction and by the number of the ester radicals entering the cellulose molecule, the properties of the product can be modified to a great extent.

The mixed esters produced in this manner, for instance, from cellulose nitrate, have the special advantage that the combustibility is considerably reduced. The nitrogen content of a cellulose nitrate having 10.8 per cent of nitrogen is, for instance reduced to 5.4 per cent by combination with a molecular proportion of the methyl cyclohexanyladipic acid ester. On treating in the same manner celllulose diacetate or 2½-acetate highly elastic products are obtained, which are essentially more stable to water than those of the starting material.

Since there is available a large number of suitable acid esters of polybasic acids which can easily be obtained and transformed into the chlorides, the process can be carried out in very varied manner. Esters which can be utilized according to the invention are, for instance, the esters derived from monohydric or polyhydric alcohols and adipic acid, methyladipic acid or phosphoric acid. The chloride of the acid ester need not always be isolated; in most cases it will suffice to form the chloride from the acid ester in presence of the cellulose material to be esterified.

The following examples illustrate the invention, the parts being by weight:—

*Example 1.*—100 parts of nitrocellulose film waste are dissolved in a mixture of 300 parts of ethyl acetate and 200 parts of benzene and to the solution 80 parts of dibutylphosphate are added. 70 parts of thionyl chloride are added in rations to the strongly viscous solution whereat the mixture is thoroughly mixed after each addition. The reaction preferably is carried out in a distilling vessel which is provided with a stirrer. The reacting mass is heated to about 60 to 65° C. until the evolution of sulfur dioxide and hydrogen chloride ceases. Then the temperature is raised to about 95° C. and the greater portion of the solvent is removed by distillation. While stirring, water is introduced into the reaction vessel, whereupon the mixed ester separates in form of white flakes. It is washed with water and extracted with alcohol in order to free it from acid and dibutyl phosphate in excess.

From 100 parts of film waste containing about 90 parts of nitrocellulose with a nitrogen content of 12.2 per cent, about 125 to 128 parts of the mixed ester are obtainable.

The analysis shows that one molecular proportion of $C_6H_{10}O_5$ contains chemically bound a half molecular proportion of phosphoric acid dibutyl ester. (Nitrogen content found: 9.6, calculated 9.86).

*Example 2.*—Nitrocellulose containing 11.7 per cent of nitrogen is worked up according to the details given in Example 1. The end product purified with water and alcohol contains 7.6 per cent of nitrogen, its inflammability is essentially diminished when compared with nitrocellulose.

*Example 3.*—100 parts of cellulose acetate containing chemically bound 53 per cent of acetic acid are dissolved in 300 parts of methyl acetate and 200 parts of methylene chloride. To this solution are added 70 parts of the monocyclohexanyl ester of adipic acid dissolved in 140 parts of benzene. After thoroughly mixing, a solution of 50 parts of thionyl chloride in 50 parts of benzene is added and the mixture is heated under reflux. The chloride of the adipic acid mono ester is formed which reacts with the unsubstituted OH groups of the cellulose acetate. As soon as the reaction is complete, the solvents are removed by distillation and the remainder is washed and worked up in the usual manner.

My invention is not limited to the foregoing examples or to the specific details given therein. Thus, for instance, any other of the well known esterifying processes may be used in order to introduce the substituted radicle of a polybasic acid into the cellulose radicle. By way of example I enumerate the following substituted acids which may be esterified with a cellulose ester containing still free OH groups: Mono- or diphenyl or cresyl phosphoric acid, monoethyl, butyl, amyl or cyclohexanyl oxalic acid, monobutyl or amyl tartaric acid, the homologues and substituted derivatives of these compounds and so on. Obviously, I may prepare the correspondent chlorides of these acid esters in a separate operation and react them with the cellulose esters in question, if necessary in the presence of an acid binding agent, such as pyridine, quinoline or a tertiary amine of the aliphatic series, such as trihydroxyethyl amine or trialkyl amine.

Instead of the cellulose esters serving as starting materials used in the foregoing examples I may subject to the reaction described above other cellulose compounds having still free esterifiable OH groups such as, for instance, cellulose formate, cellulose propionate, cellulose butyrate or mixed esters such as cellulose nitrate-acetate, cellulose acetate-butyrate or the homologues or substitution products thereof.

What I claim is:—

1. An acetylcellulose containing chemically bound the radicle of the cyclohexanylmono ester of adipic acid and which is obtainable by the process defined in claim 2.

2. The process which comprises acting upon a cellulose ester containing still esterifiable OH groups with a chloride of an acid ester of a polybasic acid selected from the group consisting of aliphatic acids and phosphoric acid.

3. The process which comprises acting upon a cellulose ester containing still esterifiable OH groups with an acid ester of a polybasic acid selected from the group consisting of aliphatic acids and phosphoric acid in the presence of a chloride of the group consisting of thionyl chloride, sulfuryl chloride, phosphorus chloride, and phosphorus oxychloride.

4. The process which comprises acting upon a cellulose ester containing still esterifiable OH groups with a chloride of an acid ester of a polybasic acid selected from the group consisting of aliphatic acids and phosphoric acid in the presence of an acid binding agent.

5. A cellulose ester containing chemically bound a radical of a polybasic acid, selected from the group consisting of phosphoric acid and aliphatic acids whose neutral esters have a gelatinizing or softening action on cellulose derivatives, partly esterified by an alcohol of the group consisting of aliphatic alcohols and hydroxybenzene compounds and being obtainable by the process defined in claim 2.

6. A nitrocellulose containing chemically bound a radical of a polybasic acid, selected from the group consisting of phosphoric acid and aliphatic acids whose neutral esters have a gelatinizing or softening action on cellulose derivatives, partly esterified by an alcohol of the group consisting of aliphatic alcohols and hydroxy benzene compounds and being obtainable by the process defined in claim 2.

7. An acetylcellulose containing chemically bound a radical of a polybasic acid, selected from the group consisting of phosphoric acid and aliphatic acids whose neutral esters have a gelatinizing or softening action on cellulose derivatives, partly esterified by an alcohol of the group consisting of aliphatic alcohols and hydroxybenzene compounds and being obtainable by the process defined in claim 2.

8. A nitrocellulose of the general formula:

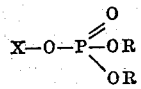

wherein R stands for alkyl, phenyl or cresyl and X represents a nitrocellulose radical, said compound being obtainable by the process defined in claim 2.

9. A nitrocellulose which contains about 9.6 per cent of nitrogen and half a molecular proportion of phosphoric acid dibutyl ester to one molecular proportion of $C_6H_{10}O_5$, and which is obtainable by the process defined in claim 3.

ADOLF WEIHE.